United States Patent
Sunnegårdh et al.

(10) Patent No.: US 10,676,095 B2
(45) Date of Patent: Jun. 9, 2020

(54) METHOD AND A SYSTEM FOR IMPROVED GEAR SHIFTING OF A TRANSMISSION

(71) Applicant: Scania CV AB, Södertälje (SE)

(72) Inventors: Erik Sunnegårdh, Tullinge (SE); Magnus Johansson, Södertälje (SE)

(73) Assignee: Scania CV AB, Södertälje (SE)

( * ) Notice: Subject to any disclaimer, the term of this patent is extended or adjusted under 35 U.S.C. 154(b) by 178 days.

(21) Appl. No.: 15/781,973

(22) PCT Filed: Dec. 19, 2016

(86) PCT No.: PCT/SE2016/051287
§ 371 (c)(1),
(2) Date: Jun. 6, 2018

(87) PCT Pub. No.: WO2017/119837
PCT Pub. Date: Jul. 13, 2017

(65) Prior Publication Data
US 2018/0362046 A1    Dec. 20, 2018

(30) Foreign Application Priority Data

Jan. 5, 2016  (SE) ...................... 1650008

(51) Int. Cl.
*F16H 63/50* (2006.01)
*B60W 30/19* (2012.01)
*F02D 41/02* (2006.01)

(52) U.S. Cl.
CPC ........... *B60W 30/19* (2013.01); *F02D 41/022* (2013.01); *F02D 41/023* (2013.01);
(Continued)

(58) Field of Classification Search
CPC ......... B60W 30/19; B60W 2510/0657; B60W 2510/0638; F02D 41/022; F02D 41/023;
(Continued)

(56) References Cited

U.S. PATENT DOCUMENTS 4,720,792 A * 1/1988 Kasai ................... B60W 10/02
477/111
2005/0124460 A1 6/2005 Iriyama
(Continued)

FOREIGN PATENT DOCUMENTS

DE 102009027502 A1 2/2010
DE 102010042474 A1 4/2011
(Continued)

OTHER PUBLICATIONS

International Search Report for International Application No. PCT/SE2016/051287 dated Mar. 2, 2017.
(Continued)

*Primary Examiner* — Sherry L Estremsky
(74) *Attorney, Agent, or Firm* — Moore & Van Allen PLLC; W. Kevin Ransom

(57) ABSTRACT

The invention relates to a method for improved gear shifting of a vehicle having an Otto-engine and a vehicle transmission with a manually actuated clutch of the vehicle transmission, comprising the steps of: determining a first set of condition parameter values, said parameters comprising clutch position, requested engine torque and engine speed; determining if the first set of condition parameter values meet first predetermined conditions; if the first predetermined conditions of said first set of condition parameter values are met, activating a function for interrupting fuel provision of the engine before disengaging the vehicle transmission during gear shifting. The invention also relates also to system and a computer program product for implementing the method and a motor vehicle equipped with the system.

19 Claims, 5 Drawing Sheets

(52) U.S. Cl.
CPC ...... *F02D 41/0235* (2013.01); *F02D 41/0225* (2013.01); *F02D 2200/0802* (2013.01); *F02D 2200/0814* (2013.01); *F02D 2200/101* (2013.01); *F02D 2200/1002* (2013.01); *F02D 2250/21* (2013.01)

(58) Field of Classification Search
CPC ....... F02D 2200/1002; F02D 2200/101; F02D 41/123; F16H 63/502
See application file for complete search history.

(56) References Cited

U.S. PATENT DOCUMENTS

| 2005/0215396 | A1 |   | 9/2005  | Shimada et al. |
| 2008/0255739 | A1 |   | 10/2008 | Murayama et al. |
| 2013/0158838 | A1 | * | 6/2013  | Yorke ............. B60W 30/18018 701/103 |

FOREIGN PATENT DOCUMENTS

| DE | 102011016643 A1 | 10/2012 |
| DE | 102011103692 A1 | 12/2012 |
| JP | 2006207430 A    | 8/2006  |

OTHER PUBLICATIONS

Written Opinion of the International Searching Authority for International Application No. PCT/SE2016/051287 dated Mar. 2, 2017.
Scania CV AB, International Application No. PCT/SE2016/051287, International Preliminary Report on Patentability, dated Jul. 10, 2018.
Scania CV AB, European Application No. 16884077.5, Extended European Search Report, dated Jul. 12, 2019.
Scania CV AB, Korean Application No. 10-2018-7021543, Office Action, dated Jul. 30, 2019.

* cited by examiner

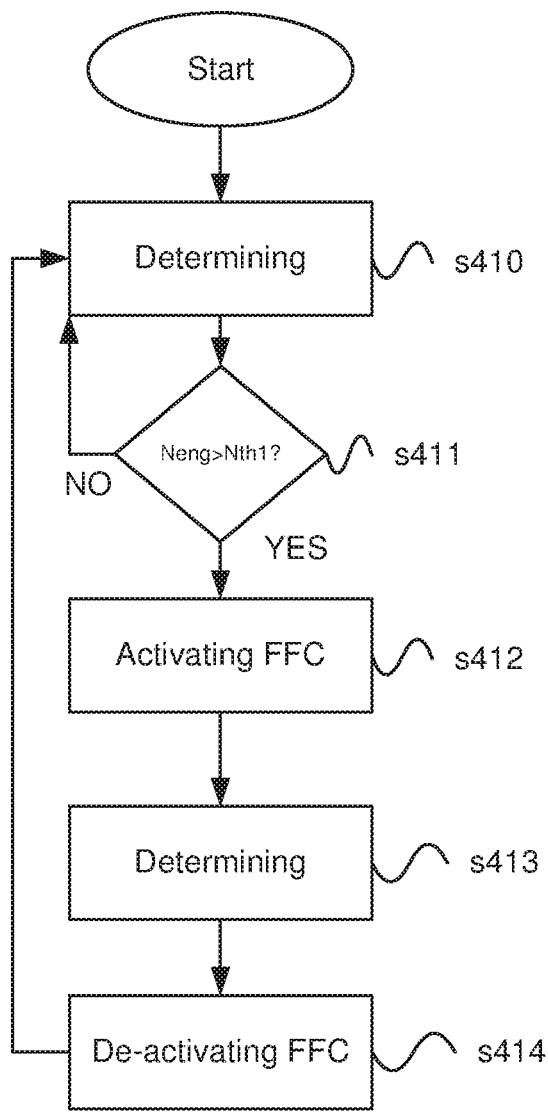 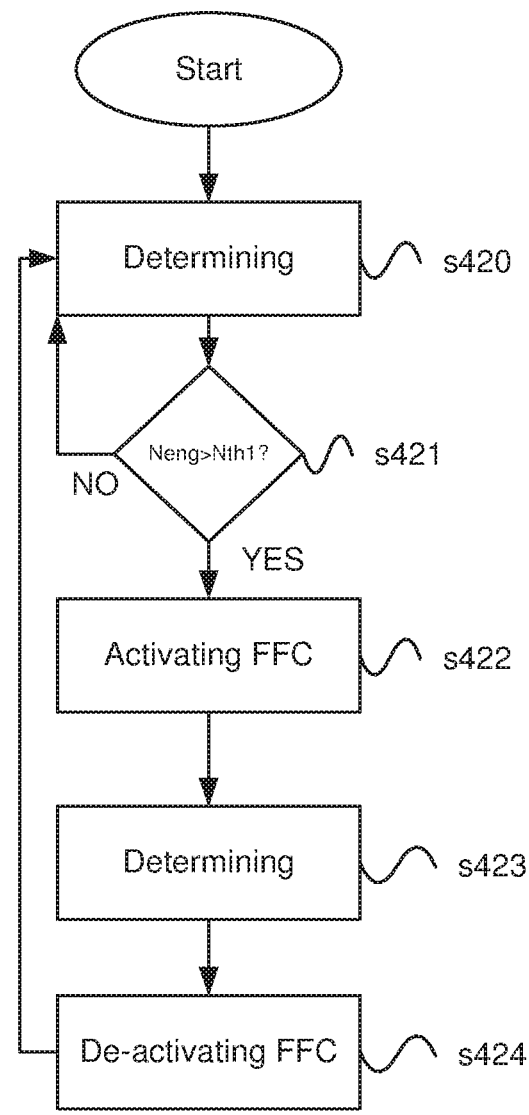
Fig. 4b
Fig. 4c

METHOD AND A SYSTEM FOR IMPROVED GEAR SHIFTING OF A TRANSMISSION

CROSS-REFERENCE TO RELATED APPLICATION(S)

This application is a National Stage Application (filed under 35 § U.S.C. 371) of PCT/SE2016/051287, filed Dec. 19, 2016 of the same title, which, in turn claims priority to Swedish Application No. 1650008-4 filed Jan. 5, 2016 of the same title; the contents of each of which are hereby incorporated by reference.

FIELD OF THE INVENTION

The present invention relates to a method, system and computer program product for improved gear shifting of a vehicle having an Otto-engine and a manually actuated clutch of a vehicle transmission. The invention relates also to a motor vehicle equipped with the system and/or computer program product.

BACKGROUND OF THE INVENTION

When performing gear shifting of a transmission of a vehicle being equipped with a manually controlled clutch and gearbox an air flow provided to an intake manifold need to be reduced so as to allow said gear shift. This is in particular relevant if the vehicle is provided with a port fuel injection (PFI) assembly of an Otto-engine. It is important to perform relevant A-controlled operation during said gear shift. Hereby gear shifts are executed relatively slowly because of inherent characteristics of various actuator means, such as e.g. throttle and dump valve, prevailing engine speed, etc., affecting air dynamics.

These systems may be associated with impaired manoeuvrability of the vehicle, in particular during gear shifting of a transmission thereof. Further, generated engine misfire may damage components of an emission control system of said engine. Hereby noise emissions in the form of loud bangs may also occur.

SUMMARY OF THE INVENTION

An aspect of the present invention is to propose a novel and advantageous method for improved gear shifting of a vehicle having an Otto-engine and a manually actuated clutch of the vehicle transmission.

Another aspect of the invention is to propose a novel and advantageous system and a novel and advantageous computer program for improved gear shifting of a vehicle having an Otto-engine and a manually actuated clutch of the vehicle transmission.

An aspect of the present invention is to propose a novel and advantageous method providing a reduced overall time period relating to a gear shifting of a transmission in a vehicle in a cost efficient way.

Another aspect of the invention is to propose a novel and advantageous system and a novel and advantageous computer program providing a reduced overall time period relating to a gear shifting of a transmission in a vehicle in a cost efficient way.

Yet another aspect of the invention is to propose a method, a system and a computer program achieving improved manoeuvrability of a vehicle having an Otto-engine and a manually operated clutch and gearbox of a transmission thereof.

Yet another aspect of the invention is to propose a method, a system and a computer program achieving reduced engine speed oscillations during gear shifting of a manually operated transmission of an Otto-engine.

Yet another aspect of the invention is to propose an alternative method, an alternative system and an alternative computer program for improved gear shifting of a vehicle having an Otto-engine and a manually actuated clutch of the vehicle transmission.

Yet another aspect of the invention is to propose a method, a system and a computer program providing improved noise emissions during gear shifting of a transmission associated with an Otto-engine.

According to an aspect of the invention there is provided a method for improved gear shifting of a vehicle having an Otto-engine and a manually actuated clutch of the vehicle transmission, comprising the steps of:

determining a first set of condition parameter values, said parameters comprising clutch position, requested engine torque and engine speed;

determining if said first set of condition parameter values meet first predetermined conditions; and if said first predetermined conditions of said first set of condition parameter values are met, activating a function for interrupting fuel provision of said engine before disengaging said vehicle transmission during gear shifting.

When it is determined that said clutch has been disengaged to a certain extent and that said requested engine torque is below a certain low value and that said engine speed exceeds a certain value said function for interrupting fuel provision of said engine is activated. Hereby a forced fuel cut process is performed, which in turn reduces a prevailing engine torque abruptly. Hereby gear shifting of a gearbox of said transmission may be performed in a relatively short period of time. Hereby improved gear shifting of a vehicle having an Otto-engine is achieved. Said forced fuel cut may advantageously be performed during any prevailing engine load and engine speed. Hereby a versatile method is provided.

The method may comprise the steps of:

determining a gear step value chosen to be shifted to, preferably differing from a neutral gear step; and adding said gear step to said first set of condition parameter values.

Hereby a more accurate and robust method for improved gear shifting of a vehicle transmission is achieved.

The method may comprise the steps of:

determining a difference between a prevailing engine speed value and an engine speed should value; and adding said difference to said first set of condition parameter values.

Hereby a more accurate and robust method for improved gear shifting of a vehicle transmission is achieved.

The method may comprise the steps of:

determining a prevailing fuel loading value of an exhaust gas catalyst arrangement of the engine;

determining a prevailing temperature value of said exhaust gas catalyst arrangement; and adding said prevailing fuel loading value and said temperature value to said first set of condition parameter values.

Hereby said inventive method is applicable to vehicle having an exhaust gas catalyst arrangement and further reduces risk of negative influence and impaired performance of said exhaust gas catalyst arrangement. Hereby a too high temperature of said catalyst arrangement and too high fuel loading of said catalyst arrangement may be considered so as to prevent forced fuel cut to be performed during these undesired operation states.

The method may comprise the steps of:

determining a second set of condition parameter values, said condition parameters comprising requested engine torque and engine speed; and if at least one of said second set of condition parameter values meet a respective second predetermined condition, de-activating said function so as to allow fuel provision.

Hereby normal fuel provision to said engine is provided in a reliable, accurate and efficient manner. This embodiment is applicable to torque controlled operation of said engine.

The method may comprise the steps of:

determining a second set of condition parameter values, said condition parameters comprising requested engine torque, engine speed and a difference between a prevailing engine speed and an engine speed should value; and if at least one of said second set of condition parameter values meet a respective second predetermined condition, de-activating said function so as to allow fuel provision.

Hereby normal fuel provision to said engine is provided in a reliable, accurate and efficient manner. This embodiment is applicable to engine speed controlled operation of said engine.

The method may comprise the step of:

providing said engine fuel in a vaporized form. Hereby forced fuel cut may be performed effectively according to the inventive method. Hereby no wall-wetting of an intake manifold is present, which advantageously provides a rapid reduction of provided actual engine torque after a forced fuel cut process according to the inventive method.

According to an aspect of the invention there is provided a system for improved gear shifting of a vehicle having an Otto-engine and a manually actuated clutch of the vehicle transmission, comprising:

means for determining a first set of condition parameter values, said parameters comprising clutch position, requested engine torque and engine speed;

means for determining if said first set of condition parameter values meet first predetermined conditions; and means for, if said first predetermined conditions of said first set of condition parameter values are met, activating a function for interrupting fuel provision of said engine before disengaging said vehicle transmission during gear shifting.

Said engine may be a port fuel injected (PFI) Otto-engine operated by gas fuel (vaporized fuel).

The system may comprise:

means for determining a gear step value chosen to be shifted to, preferably differing from a neutral gear step; and means for adding said gear step to said first set of condition parameter values.

The system may comprise:

means for determining a difference between a prevailing engine speed value and an engine speed should value; and means for adding said difference to said first set of condition parameter values.

The system may comprise:

means for determining a prevailing fuel loading value of an exhaust gas catalyst arrangement of the engine;

means for determining a prevailing temperature value of said exhaust gas catalyst arrangement; and means for adding said prevailing fuel loading value and said temperature value to said first set of condition parameter values.

The system may comprise:

means for determining a second set of condition parameter values, said condition parameters comprising requested engine torque and engine speed; and means for, if at least one of said second set of condition parameter values meet a respective second predetermined condition, de-activating said function so as to allow fuel provision.

The system may comprise:

means for determining a second set of condition parameter values, said condition parameters comprising requested engine torque, engine speed and a difference between a prevailing engine speed and an engine speed should value; and means for, if at least one of said second set of condition parameter values meet a respective second predetermined condition, de-activating said function so as to allow fuel provision.

The system may comprise:

means for providing said engine fuel in a vaporized form.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program product containing a program code stored non-volatile on a non-transitory computer-readable medium for performing the method described herein.

Further aspects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognize further applications, modifications and incorporations in other fields, which are within the scope of the invention.

BRIEF DESCRIPTION OF THE DRAWINGS

For fuller understanding of the present invention and its further aspects and advantages, the detailed description set out below should be read in conjunction with the accompanying drawings, in which the same reference notations denote similar items in the various diagrams, and in which:

FIG. 4b is a more detailed schematic flowchart of a method according to an embodiment of the invention FIG. 4c is a more detailed schematic flowchart of a method according to an embodiment of the invention.

DETAILED DESCRIPTION OF THE INVENTION

Figure 1:
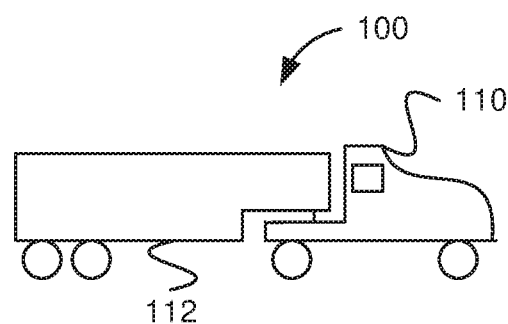
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system is applicable to various vehicles, such as e.g. a mining machine, tractor, dumper, wheel loader, platform comprising an industrial robot, forest machine, earth mover, road construction vehicle, road planner, emergency vehicle or a tracked vehicle.

It should be noted that the invention is suitable for application in various systems comprising an Otto-engine and thereto associated manually operated clutch and gearbox of a transmission. It should be noted that the invention is suitable for application with any combustion Otto-engine and is therefore not confined to combustion engines of motor vehicles. The innovative method and the innovative system in one aspect of the invention are well suited to other platforms which comprise an Otto-engine system than motor vehicles, e.g. watercraft. The watercraft may be of any kind, e.g. motor boats, steamers, ferries or ships.

The innovative method and the innovative system according to one aspect of the invention are also well suited to, for example, systems which comprise industrial engines and/or engine-powered industrial robots an associated manually controlled transmission.

The innovative method and the innovative system according to one aspect of the invention are also well suited to various kinds of power plants, e.g. an electric power plant which comprises an engine-powered generator and an associated manually controlled transmission.

The innovative method and the innovative system are also well suited to various Otto-engine systems, e.g. on a locomotive or some other platform.

The innovative method and the innovative system are also well suited to any system which comprises an Otto type NO, generator and a manually operated transmission.

The term "link" refers herein to a communication link which may be a physical connection such as an optoelectronic communication line, or a non-physical connection such as a wireless connection, e.g. a radio link or microwave link.

The term "passage" refers herein to a pipe for holding and conveying emissions from an engine. The passage may be a pipe of any desired size and be made of any suitable material, e.g. any suitable alloy or metal.

Figure 2A:
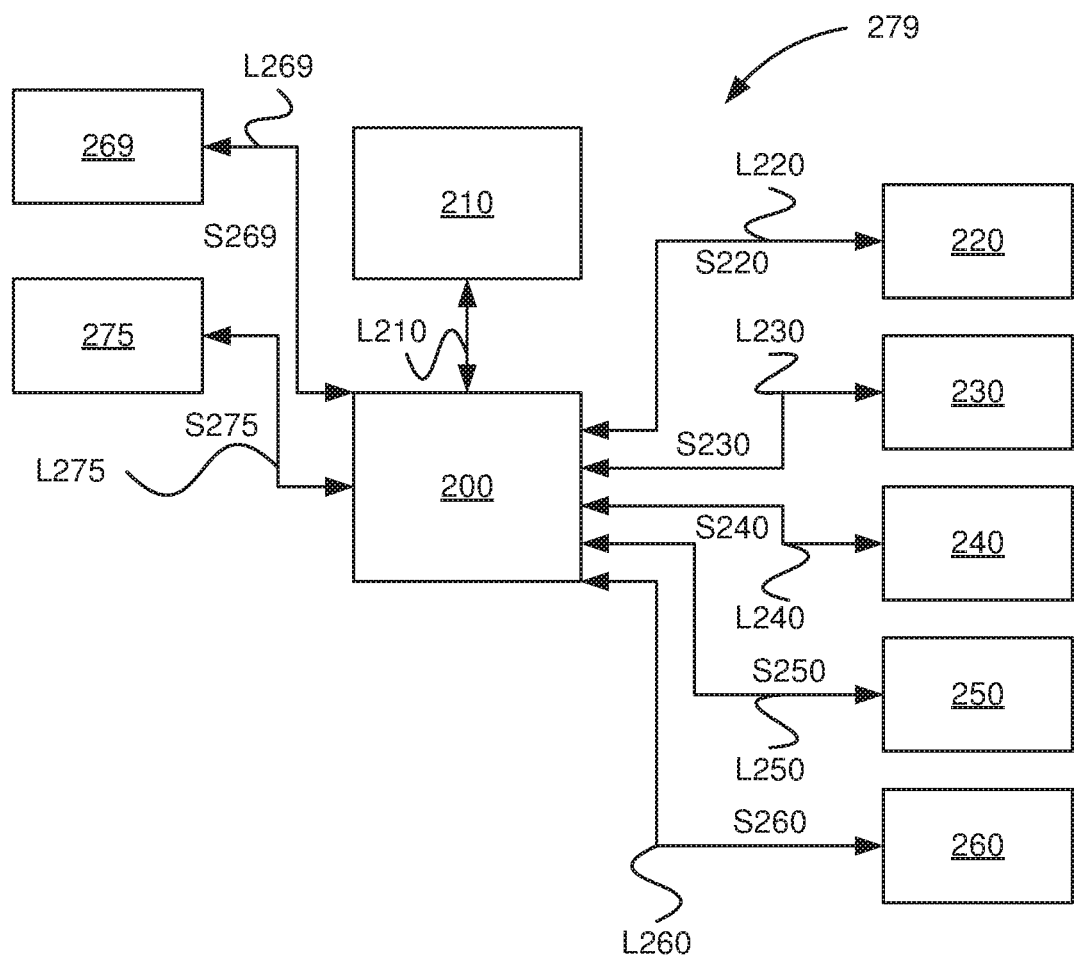
FIG. 2a schematically illustrates a subsystem of the vehicle depicted in FIG. 1, according to an embodiment of the invention.

With reference to FIG. 2a there is illustrated a sub-system 279 of said vehicle 100 according to an aspect of the invention.

An engine speed sensor 220 is arranged for communication with a first control unit 200 via a link L220. Said engine speed sensor 220 is arranged to continuously or intermittently determine a prevailing engine speed Neng of an engine 231. Said engine speed sensor 220 is arranged to continuously or intermittently send signals S220 comprising information about said detected engine speed Neng to said first control unit 200 via said link L220.

A clutch position sensor 230 is arranged for communication with said first control unit 200 via a link L230. Said clutch position sensor 230 is arranged to continuously or intermittently determine a prevailing clutch position CP of a clutch arrangement 241. Said clutch position sensor 230 is arranged to continuously or intermittently send signals S230 comprising information about said detected clutch position CP to said first control unit 200 via said link L230. Said clutch position CP is herein given in percent (%), wherein 0% refers to a state of said clutch arrangement 241 being in a fully closed position and wherein 100% refers to a state of said clutch arrangement 241 being in a fully open position.

An accelerator pedal position sensor 240 is arranged at an accelerator pedal (not shown) of the vehicle 100 and is further arranged for communication with said first control unit 200 via a link L240. Said accelerator pedal is operated by an operator of the vehicle 100, whereby said operator can request an engine torque Tq_demand for propelling said vehicle 100. Said accelerator position sensor 240 is arranged to continuously or intermittently determine a requested engine torque Tq_demand and continuously or intermittently send signals S240 comprising information about said detected requested engine torque Tq_demand to said first control unit 200 via said link L240. Said first control unit 200 is arranged to determine a requested engine torque Tq_demand based upon said signal S240 and/or any other signal comprising information regarding a requested engine torque, e.g. generated by a cruise control function of the vehicle 100. A total sum of requested engine torque is herein denoted Tq_demand.

A temperature sensor 250 is arranged at a TWC-arrangement (Three Way Catalyst) of the vehicle 100 and is further arranged for communication with said first control unit 200 via a link L250. Said temperature sensor 250 is arranged to continuously or intermittently determine a prevailing temperature Temp of a TWC-unit 270 and continuously or intermittently send signals S250 comprising information about said detected temperature to said first control unit 200 via said link L250. According to another example said temperature sensor 250 may be arranged at a first passage 255 for determining a prevailing temperature of exhaust gas from said engine 231, whereby said first control unit is arranged to, based on a calculation model, determine an estimate of a temperature Temp relating to said TWC-arrangement 270. Herein said first control unit 200 may be arranged to determine/calculate/estimate/model a prevailing temperature of said TWC-unit 270.

Said first control unit 200 is arranged to determine a selected gear step GS of a gearbox 251. Said gear step GS is manually requested by an operator of the vehicle 100 by any suitable means, such as a gear shifting device 275, e.g. in the form of a gear stick or gear shifting paddles. Said operator may hereby select a gear step and affect said gear stick or gear shifting paddles so as to perform a desired gear shift of said gearbox 251. Said gear shifting device 275 is arranged for communication with said first control unit 200 via link L275. According to one example said manually operated gear shifting device 275 is arranged to whenever applicable send signals S275 comprising information about said selected gear step to said first control unit 200 via said link L240 for operation of said gearbox 251.

The first control unit 200 is arranged to continuously or intermittently determine an engine parameter value Delta_Neng. Said engine parameter value Delta_Neng is defined as:

$$Delta\_Neng = Neng - Nengshould,$$

wherein Nengshould is a determined should value for the engine speed 231.

The first control unit 200 is arranged to continuously or intermittently determine a fuel loading value HC_load representing a prevailing degree of fuel loading in said TWC-arrangement 270. Said fuel loading value HC_load is herein given in percent (%), whereby 0% represents a state of no fuel loading of said TWC-arrangement 270 and 100% represents a state of maximum fuel loading of said TWC-arrangement 270. This may be performed in any suitable manner, e.g. paying regard to an amount fuel provided to a subsystem 299 and temperature of exhaust gas from said engine 231.

A manually operated clutch pedal 260 is arranged for communication with the first control unit 200 via a link L260. Said clutch pedal 260 is arranged to continuously or intermittently send signals S260 comprising information about a requested clutch position to the first control unit 200 via said link L260. The first control unit 200 is arranged to operate said clutch arrangement 241 in accordance therewith. Alternatively, said manually operated clutch pedal is mechanically connected to said clutch arrangement 241 for adequate operation.

The first control unit 200 is arranged for communication with a fuel injection assembly 269 for providing fuel to said engine 231 via a link L269. The first control unit is 200 is arranged to control operation of said fuel injection assembly by means of signals S269 transmitted via said link L269. Hereby said first control unit 200 is arranged for A-control of said engine 231.

According to an embodiment said first control unit 200 is arranged to activate a function F for interrupting fuel provision of said engine 231 before disengaging said vehicle transmission during gear shifting. Activation of said function F provides an immediate fuel supply shut down if certain criteria are met. This procedure is also denoted forced fuel cut. This may be performed independently of a current load of the engine 231. This may be performed independently of a current air provision (and associated fuel supply) to said engine 231.

According to an embodiment said first control unit 200 is arranged to de-activate said function F for allowing fuel provision of said engine 231 when suitable. De-activation of said function F provides a substantially immediate allowance of fuel supply to said engine 231 if certain criteria are met.

A second control unit 210 is arranged for communication with the first control unit 200 via a link L210. It may be releasably connected to the first control unit 200. It may be a control unit external to the vehicle 100. It may be adapted to performing the innovative method steps according to the invention. It may be used to cross-load software to the first control unit 200, particularly software for applying the innovative method. It may alternatively be arranged for communication with the first control unit 200 via an internal network on board the vehicle. It may be adapted to performing functions corresponding to those of the first control unit 200, e.g. activating a function F for interrupting fuel provision of said engine 231 before disengaging said vehicle transmission during gear shifting or de-activating said function F so as to again allow fuel provision to said engine 231 according to what is depicted herein.

Figure 2B:
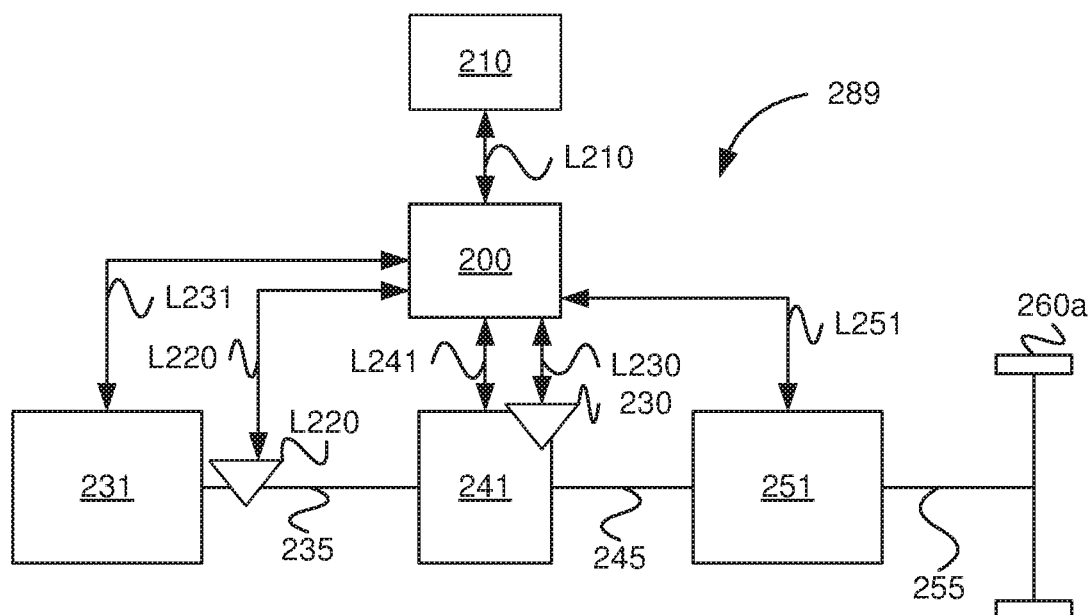
FIG. 2b schematically illustrates a subsystem of the vehicle depicted in FIG. 1, according to an embodiment of the invention.

FIG. 2b schematically illustrates a subsystem 289 of the vehicle 100 shown in FIG. 1, according to an aspect of the invention.

This subsystem 289 is situated in the tractor unit 110 and comprises a combustion engine 231 with an output shaft 235 which is connected to a manually operated clutch arrangement 241. The combustion engine 231 is a so called Otto-engine. Said combustion engine 231 is powered by gas fuel, such as natural gas or any suitable vaporized fuel. The clutch arrangement 241 may be a manually controlled automated clutch arrangement. This clutch arrangement 241 is also connected to a shaft 245 which is an input shaft to a manually controlled gearbox 251. The gearbox 251 may be configured to comprise any suitable number of gear steps, e.g. 5, 12 or 16. The gearbox 251 has an output shaft 255 to transmit torque to at least one pair of tractive wheels comprising a first tractive wheel 260a and a second tractive wheel 260b.

The engine 231 is arranged to generate torque which can be transmitted to said tractive wheels 260a and 260b so as to propel the vehicle 100. Said torque is hereby transmitted via a transmission of the vehicle comprising the shaft 235, the clutch arrangement 241, the shaft 245, the gearbox 251 and the shaft 255.

The first control unit 200 is arranged for communication with said engine 231 via a link L231 and is adapted for controlling the operation of said engine 231 in accordance with stored control routines. During normal operation the first control unit 200 is arranged to control air and thus fuel supply to said engine 231 according to stored operational routines (A-controlled). Hereby said first control unit 200 is arranged to, when applicable, de-activate fuel provision to said engine 231 according to an embodiment of the invention. The first control unit 200 is hereby arranged to, when suitable, shut down fuel supply to said engine 231 by controlling said fuel injector assembly 269. Hereby said first control unit 200 is arranged to re-activate fuel provision to said engine 231 according to an embodiment of the invention. The first control unit 200 is hereby arranged to, when suitable, re-start fuel supply to said engine 231 by controlling said fuel injector assembly 269.

The first control unit 200 is arranged for communication with said clutch arrangement 241 via a link L241 and is adapted for controlling the operation of said clutch arrangement 241 in accordance with vehicle operator actions. Hereby an operator of the vehicle 100 manually may control said clutch arrangement 241 by means of said clutch pedal 260 for achieving desired gear shifting during operation of said vehicle 100.

The first control unit 200 is arranged for communication with said gearbox 251 via a link L251 and is adapted to controlling the operation of said gearbox 251 in accordance with vehicle operator actions. Hereby an operator of the vehicle 100 manually may control said gearbox 251 by means of said gear shifting device 275 for achieving desired gear shifting during operation of said vehicle 100.

Said shaft 235 is provided with an engine speed sensor 220 to continuously determine a prevailing engine speed Neng of said engine 231. This engine speed sensor 220 is adapted to continuously or intermittently send signals S220 which contain information about said determined prevailing engine speed Neng to the first control unit 200 via said link L220. The first control unit 200 is adapted to continuously receiving said signals S220 and temporarily storing in a memory in it said information about the prevailing engine speed Neng. Said engine speed sensor 220 may alternatively be situated in any other suitable position for determining a prevailing engine speed Neng of said engine 231, such as at a fly-wheel of said engine 231.

Said clutch arrangement 241 is provided with said clutch position sensor 230 so as to continuously determine a prevailing clutch position CP of said clutch arrangement 241. This clutch position sensor 230 is adapted to continuously or intermittently send signals S230 which contain information about said determined prevailing clutch position CP to the first control unit 200 via said link L230. The first control unit 200 is adapted to continuously receiving said signal S230 and temporarily storing in a memory in it said information about the prevailing clutch position CP. Said clutch position sensor 230 may alternatively be situated in any other suitable position for determining a prevailing clutch position CP of said clutch arrangement 241, such as at said clutch pedal 260.

Figure 2C:
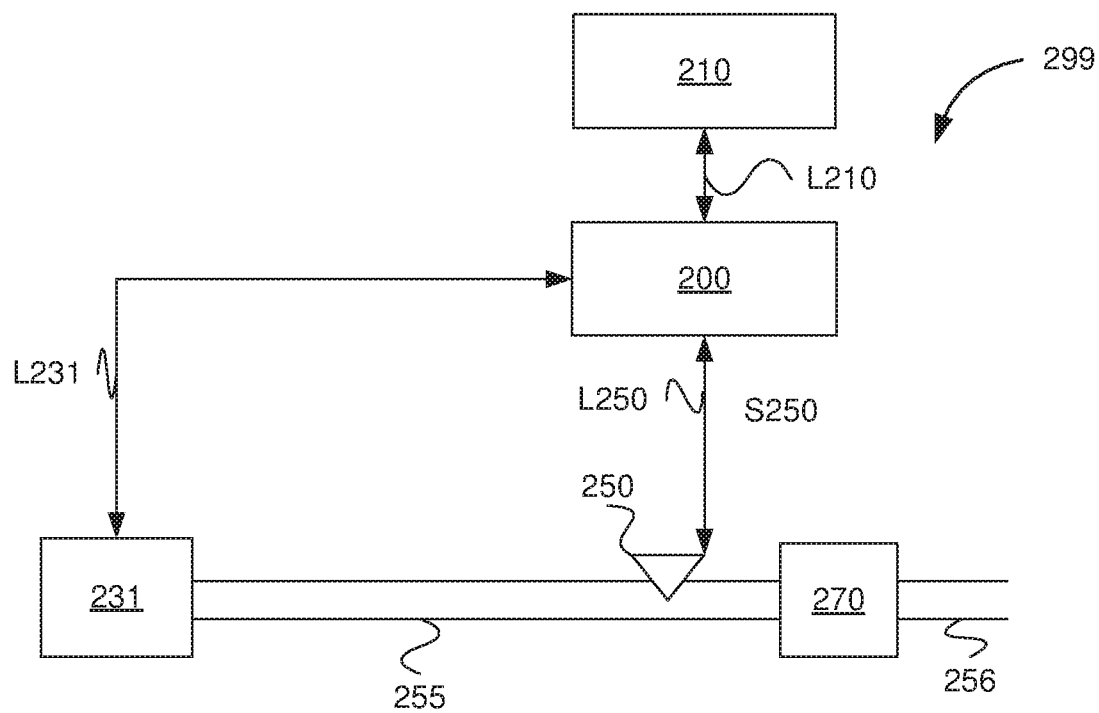
FIG. 2c schematically illustrates a subsystem of the vehicle depicted in FIG. 1, according to an example embodiment.

FIG. 2c schematically illustrates a subsystem 299 of the vehicle 100 shown in FIG. 1, according to an example embodiment. Said sub-system 299 comprises a TWC-system. It should be noted that the vehicle 100 does not necessarily need to comprise a TWC-system, however if so, additional condition parameter values and associated conditions may be implemented regarding the inventive method as depicted herein, such as parameters relating to fuel loading and prevailing temperature of a TWC-unit 270.

The engine 231, which is an Otto-engine, is during operation generating an exhaust gas flow. The exhaust gas flow is led via a first passage 255 to said TWC-unit 270. A second passage 256 is arranged to lead said exhaust gas from said TWC-unit 270 to an environment of said vehicle 100.

A temperature sensor 250 is arranged upstream of said TWC-unit 270 at said first passage 255. Said temperature sensor 250 is arranged for communication with the first control unit 200 via said link L250. The temperature sensor 250 is arranged to continuously or intermittently determine a prevailing temperature of the exhaust gas in the first passage 255. The temperature sensor 250 is arranged to continuously or intermittently send signals S250 comprising information about said prevailing temperature of the exhaust gas to the first control unit 200 via the link L250. The first control unit 200 may according to an embodiment be arranged to by means of a stored model calculate a prevailing temperature Temp of the TWC-unit 270. Alternatively, the first control unit 200 is arranged to on the basis of information about for example into said engine 231 injected amount of fuel and exhaust gas mass flow calculate said prevailing temperature Temp of the TWC-unit 270. According to an embodiment said temperature sensor 250 is positioned directly at the TWC-unit 270.

Figure 3:
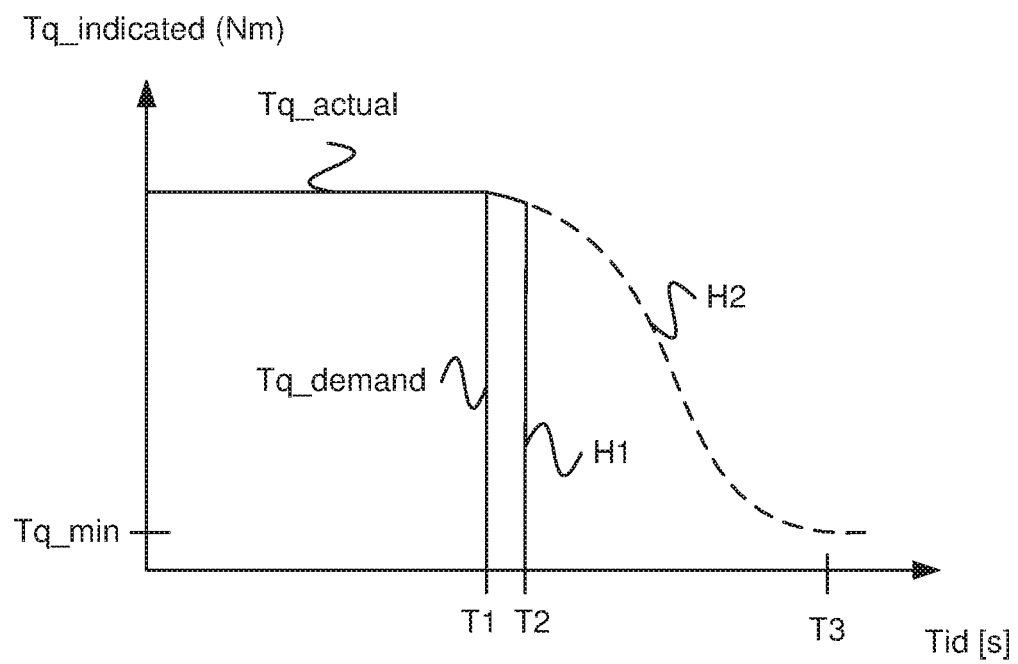
FIG. 3 schematically illustrates a diagram relating to an embodiment of the invention.

FIG. 3 schematically illustrates a diagram presenting indicated torque Tq_indicated of said engine 231 as a function of time T. Said indicated torque Tq_indicated is given in Nm and said time T is given in seconds. The diagram is intended for illustrating differences between the inventive method and a prior art method regarding gear shifting of a transmission of an Otto-engine and advantages thereof.

Herein is presented a first graph H1 relating to an actual torque Tq_actual of said engine 231 whereby a so called forced fuel cut (FFC) is performed according to an aspect of the invention. Hereby an actual torque Tq_actual of said engine 231 is abruptly decreasing from a prevailing level at a time point T2 substantially direct after said function F for interrupting fuel provision of said engine has been activated at a time point T1. This is further indicated by changing a requested torque Tq_demand from a prevailing level providing said actual torque Tq_actual before the time point T1 to a level of zero requested torque Tq_demand.

Herein is presented a second graph H2 relating to an actual torque Tq_actual of said engine 231 whereby a forced fuel cut is not performed according to an aspect of the invention. The second graph H2 is indicated by a broken line. Hereby said actual torque Tq_actual of said engine 231 is reduced in a conventional manner during gear shifting, from a prevailing level at said time point T1 down to a lowest possible level Tq_min before a gear shift of said gearbox 251 is performed.

It should be noted that the inventive method provides a shorter required time period for reducing said actual torque to said level Tq_min before a gear shift of said gearbox 251 is performed.

Figure 4A:
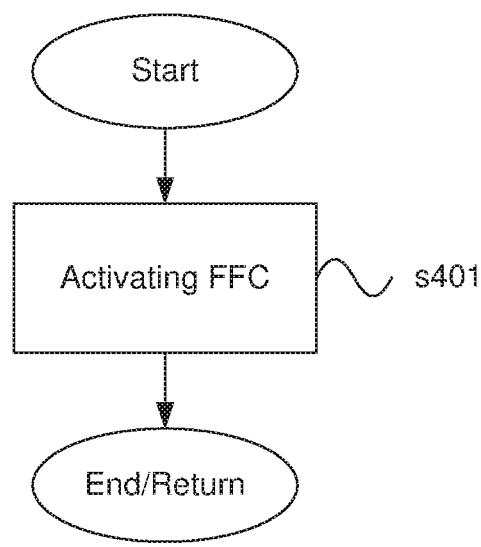
FIG. 4a is a schematic flowchart of a method according to an embodiment of the invention.

FIG. 4a schematically illustrates a flow chart of a method for improved gear shifting of a vehicle 100 having an Otto-engine 231 and a manually actuated clutch 241 of the vehicle transmission. The method comprises the method step s401. The method step s401 comprises the steps of:

determining a first set of condition parameter values, said parameters comprising clutch position CP, requested engine torque Tq_demand and engine speed Neng;

determining if said first set of condition parameter values meet first predetermined conditions; and if said first predetermined conditions of said first set of condition parameter values are met, activating a function F for interrupting fuel provision of said engine 231 before disengaging said vehicle transmission during gear shifting.

After the method step s401 the method ends/is returned.

FIG. 4b schematically illustrates a flow chart of a method for improved gear shifting of a vehicle 100 having an Otto-engine 231 and a manually actuated clutch arrangement 241 of the vehicle transmission. This example embodiment refers to an engine torque controlled operation of said engine 231. Said engine 231 may thus be controlled by an operator manually operating an accelerator pedal 240 of said vehicle 100 or e.g. by means of an electronic cruise control function. Hereby normal fuel supply to said engine 231 is in an activated state. Thus said function F for interrupting fuel provision of said engine is not activated. The method comprises a first method step s410.

The method step s410 comprises the step of determining a first set Set1 of condition parameter values, said parameters comprising at least clutch position CP (%) and requested engine torque Tq_demand (Nm). Hereby a prevailing clutch position value CP is determined, e.g. by means of said clutch position sensor 230. Hereby a current requested engine torque Tq_demand is determined, e.g. by means of said first control unit 200 and said accelerator pedal 240.

According to an example embodiment said first set Set1 of condition parameter values further comprises a gear step value, wherein a selected gear step GS of said gearbox 251 is related to a respective value. Hereby a neutral gear step of said gearbox 251 is denoted 0. Hereby a first gear step is denoted 1, a second gear step is denoted 2, etc. A reverse gear step may be denoted −1. Hereby a selected gear step GS of said gearbox 251 is determined. This may be performed by means of said first control unit 200.

According to an example embodiment said first set Set1 of condition parameter values comprises a fuel loading value HC_load and temperature Temp of said TWC-unit 270. Said fuel loading value HC_load may be determined in any suitable way, e.g. by means of said first control unit 200 and a therefore provided computer program. A prevailing temperature Temp of said TWC-unit 270 may be determined by means of said temperature sensor 250. Alternatively, said temperature Temp of said TWC-unit 270 is determined by modelling/estimating/calculating said temperature Temp by means of said first control unit 200.

Said first set Set1 of condition parameter values may according to an example comprise only said determined clutch position CP (%) and requested engine torque Tq_demand.

Said first set Set1 of condition parameter values may according to an example comprise said determined clutch position CP (%), requested engine torque Tq_demand and selected gear step GS of said gearbox 251.

Said first set Set1 of condition parameter values may according to an example comprise said determined clutch position CP (%), requested engine torque Tq_demand, fuel loading value HC_load and temperature Temp of said TWC-unit 270.

Said first set Set1 of condition parameter values may according to an example comprise said determined clutch position CP (%), requested engine torque Tq_demand, selected gear step GS of said gearbox 251, fuel loading value HC_load and temperature Temp of said TWC-unit 270.

The first step s410 further comprises the step of determining if said first set of condition parameter values meet first predetermined conditions.

Hereby said determined first set Set1 of condition parameter values is compared with respective threshold values, which may be predetermined threshold values.

Hereby said determined clutch position value CP is compared with a predetermined clutch position value X (%). Said predetermined clutch position value X may be e.g. 20%. If said determined clutch position value CP is larger than said predetermined clutch position value X this predetermined condition is met.

Hereby said determined requested engine torque value Tq_demand is compared with an engine torque value Tq_min. Said engine torque value Tq_min may be a predetermined value. Said predetermined engine torque value Tq_min may be e.g. 40 Nm. Said engine torque value Tq_min may be determined continuously or intermittently by means of said first control unit 200. Said engine torque value Tq_min is a minimum torque said engine 231 may provide during prevailing operation. If said determined requested engine torque value Tq_demand is lower than said predetermined engine torque value Tq_min this predetermined condition is met.

According to an example embodiment, said determined selected gear step value GS is compared with a predetermined gear step value GS0. Said predetermined gear step value GS0 is 0. If said selected gear step value GS differs from said predetermined gear step value GS0, i.e. that a selected gear step is a gear step allowing propulsion of said vehicle 100, this predetermined condition is met.

If applicable, said determined temperature value Temp of said TWC-unit 270 is compared with a predetermined temperature value Tth. Said predetermined temperature value Tth may be e.g. 750 degrees Celsius. If applicable, said determined fuel loading value HC_load is compared with a predetermined fuel loading value HCth. If said determined temperature value Temp of said TWC-unit 270 is exceeding said predetermined temperature value Tth and said determined fuel loading value HC_load is exceeding said predetermined fuel loading value HCth, this predetermined condition is met. This condition is thus relating to both said temperature value Temp of said TWC-unit 270 and said fuel loading value HC_load.

Hereby, if all of said condition parameter values of said first set Set1 meet said first respective predetermined condition a next step s411 is performed.

The step s411 comprises the step of determining a prevailing engine speed value Neng. Said determined engine speed value Neng is compared with a first predetermined engine speed value Nth1. If said determined engine speed value Neng is larger than said first predetermined engine speed value Nth1, i.e. YES, a subsequent method step s412 is performed. If said determined engine speed value Neng is less than said first predetermined engine speed value Nth1, i.e. NO, the method step s410 is performed again and said normal fuel provision to said engine 231 continues to be activated. Assuring that the determined engine speed value Neng is larger than said first predetermined engine speed value Nth1 reduces the risk of stalling the engine 231 when the clutch 241 is closed after the shifting process.

According to an example said method step s411 is part of said method step s410. Hereby, said determined engine speed value Neng is determined to be part of said first set Set1 of condition parameter values and said normal fuel provision to said engine 231 continues to be activated as long as not all predetermined conditions are met. If all predetermined conditions are met regarding each of said condition parameter values a subsequent method step s412 is performed. If not all predetermined conditions are met regarding each of said condition parameter values normal fuel provision to said engine continues to be activated and said first method step s410 is performed until this is not the case.

The method step s412 comprises the step of activating a function F for interrupting fuel provision of said engine 231 during gear shifting of said gearbox 251. Hereby fuel supply to the engine 231 is immediately interrupted. Hereby a forced fuel cut FFC is performed. This is controlled by means of said first control unit 200. This is performed before said clutch arrangement 241 is reaching a clutch position where said transmission is disengaged and said selected gear step of the gearbox 251 is activated. Hereby a provided torque of said engine 231 is reduced before said selected gear step GS is activated and said clutch arrangement 241 has been brought to a closed position engaging said transmission for propulsion of said vehicle 100. After the method step s412 a subsequent method step s413 is performed.

The method step s413 comprises the step of determining a second set Set2 of condition parameter values, said condition parameters comprising requested engine torque Tq_demand and engine speed Neng. If at least one of said second set of condition parameter values meet a respective second predetermined condition a subsequent method step s414 is performed.

The step s413 comprises the step of determining if said determined requested engine torque value Tq_demand is equal or larger than an engine torque value Tq_min*. Said engine torque value Tq_min* is defined as Tq_min+A, where A is a suitable positive number. Tq_min* is thus larger than said engine torque value Tq_min. If said determined engine torque value Tq_min is equal or larger than said engine torque value Tq_min* the method step s414 is performed.

The method step s413 comprises the step of determining if said determined engine speed Neng is less than a second predetermined engine speed threshold value Nth2. Nth2 is a suitable value which is smaller than said first predetermined engine speed threshold value Nth1. If said determined engine speed Neng is less than said second predetermined engine speed threshold value Nth2 the method step s414 is performed.

It should be noted that if:

Tq_demand is equal or larger than an engine torque value Tq_min*, or

Neng is less than a second predetermined engine speed threshold value Nth2 said method step s414 is performed.

The method step s414 comprises the step of de-activating said function F so as to again allow fuel provision to said engine 231. This is performed after said selected gear step GS has been activated and said clutch arrangement 241 has been brought to a closed position.

After the method step s414 said first method step s410 is performed.

FIG. 4c schematically illustrates a flow chart of a method for improved gear shifting of a vehicle 100 having an Otto-engine 231 and a manually actuated clutch arrangement 241 of the vehicle transmission. This example embodiment refers to an engine speed controlled operation of said engine 231. Said engine 231 may thus be controlled by an operator manually operating an accelerator pedal 240 of said vehicle 100 or e.g. by means of an electronic cruise control function. Hereby normal fuel supply to said engine 231 is in an activated state. Thus said function F for interrupting fuel provision of said engine is not activated. The method comprises a first method step s420.

The method step s420 comprises the step of determining a first set Set1 of condition parameter values, said parameters comprising at least clutch position CP (%), requested engine torque Tq_demand (Nm) and engine parameter value Delta_Neng. Hereby a prevailing clutch position value CP is determined, e.g. by means of said clutch position sensor 230. Hereby a current requested engine torque Tq_demand is determined, e.g. by means of said first control unit 200 and said accelerator pedal 240. Hereby a prevailing engine parameter value Delta_Neng is determined, e.g. by means of said first control unit 200.

According to an example embodiment said first set Set1 of condition parameter values further comprises a gear step value, wherein a selected gear step GS of said gearbox 251 is related to a respective value. Hereby a neutral gear step of said gearbox 251 is denoted 0. Hereby a first gear step is denoted 1, a second gear step is denoted 2, etc. A reverse gear step may be denoted −1. Hereby a selected gear step GS of said gearbox 251 is determined. This may be performed by means of said first control unit 200.

According to an example embodiment said first set Set1 of condition parameter values comprises a fuel loading value HC_load and temperature Temp of said TWC-unit 270. Said fuel loading value HC_load may be determined in any suitable way, e.g. by means of said first control unit 200 and a therefore provided computer program. A prevailing temperature Temp of said TWC-unit 270 may be determined by means of said temperature sensor 250. Alternatively, said temperature Temp of said TWC-unit 270 is determined by modelling/estimating/calculating said temperature Temp by means of said first control unit 200.

Said first set Set1 of condition parameter values may according to an example comprise only said determined clutch position CP (%), requested engine torque Tq_demand and engine parameter value Delta_Neng.

Said first set Set1 of condition parameter values may according to an example comprise said determined clutch position CP (%), requested engine torque Tq_demand, engine parameter value Delta_Neng and selected gear step GS of said gearbox 251.

Said first set Set1 of condition parameter values may according to an example comprise said determined clutch position CP (%), requested engine torque Tq_demand, engine parameter value Delta_Neng, fuel loading value HC_load and temperature Temp of said TWC-unit 270.

Said first set Set1 of condition parameter values may according to an example comprise said determined clutch position CP (%), requested engine torque Tq_demand, engine parameter value Delta_Neng, selected gear step GS of said gearbox 251, fuel loading value HC_load and temperature Temp of said TWC-unit 270.

The first step s420 further comprises the step of determining if said first set of condition parameter values meet first predetermined conditions.

Hereby said determined first set Set1 of condition parameter values is compared with respective threshold values, which may be predetermined threshold values.

Hereby said determined clutch position value CP is compared with a predetermined clutch position value X (%). Said predetermined clutch position value X may be e.g. 20%. If said determined clutch position value CP is larger than said predetermined clutch position value X this predetermined condition is met.

Hereby said determined requested engine torque value Tq_demand is compared with an engine torque value Tq_min. Said engine torque value Tq_min may be a predetermined value. Said predetermined engine torque value Tq_min may be e.g. 40 Nm. Said engine torque value Tq_min may be determined continuously or intermittently by means of said first control unit 200. Said engine torque value Tq_min is a minimum torque said engine 231 may provide during prevailing operation. If said determined requested engine torque value Tq_demand is lower than said predetermined engine torque value Tq_min this predetermined condition is met.

Hereby said determined engine parameter value Delta_Neng is compared with a predetermined engine parameter value Delta_NengTh. Said predetermined engine parameter value Delta_NengTh may be e.g. 100 RPM. If said determined engine parameter value Delta_Neng is larger than said predetermined engine parameter value Delta_NengTh this predetermined condition is met.

According to an example embodiment, said determined selected gear step value GS is compared with a predetermined gear step value GS0. Said predetermined gear step value GS0 is 0. If said selected gear step value GS differs from said predetermined gear step value GS0, i.e. that a selected gear step is a gear step allowing propulsion of said vehicle 100, this predetermined condition is met.

If applicable, said determined temperature value Temp of said TWC-unit 270 is compared with a predetermined temperature value Tth. Said predetermined temperature value Tth may be e.g. 750 degrees Celsius. If applicable, said determined fuel loading value HC_load is compared with a predetermined fuel loading value HCth. If said determined temperature value Temp of said TWC-unit 270 is exceeding said predetermined temperature value Tth and said determined fuel loading value HC_load is exceeding said predetermined fuel loading value HCth, this predetermined condition is met. This condition is thus relating to both said temperature value Temp of said TWC-unit 270 and said fuel loading value HC_load.

Hereby, if all of said condition parameter values of said first set Set1 meet said first respective predetermined condition a next step s421 is performed.

The step s421 comprises the step of determining a prevailing engine speed value Neng. Said determined engine speed value Neng is compared with a first predetermined engine speed value Nth1. If said determined engine speed value Neng is larger than said first predetermined engine speed value Nth1, i.e. YES, a subsequent method step s422 is performed. If said determined engine speed value Neng is less than said first predetermined engine speed value Nth1, i.e. NO, the method step s420 is performed again and said normal fuel provision to said engine 231 continues to be activated. Assuring that the determined engine speed value Neng is larger than said first predetermined engine speed value Nth1 reduces the risk of stalling the engine 231 when the clutch 241 is closed after the shifting process.

According to an example said method step s421 is part of said method step s420. Hereby, said determined engine speed value Neng is determined to be part of said first set Set1 of condition parameter values and said normal fuel provision to said engine 231 continues to be activated as long as not all predetermined conditions are met. If all predetermined conditions are met regarding each of said condition parameter values a subsequent method step s422 is performed. If not all predetermined conditions are met regarding each of said condition parameter values normal fuel provision to said engine continues to be activated and said first method step s420 is performed until this is not the case.

The method step s422 comprises the step of activating a function F for interrupting fuel provision of said engine 231 during gear shifting of said gearbox 251. Hereby fuel supply to the engine 231 is immediately interrupted. Hereby a forced fuel cut FFC is performed. This is controlled by means of said first control unit 200. This is performed before said clutch arrangement 241 is reaching a clutch position where said transmission is disengaged and said selected gear step of the gearbox 251 is activated. Hereby a provided torque of said engine 231 is reduced before said selected gear step GS is activated and said clutch arrangement 241 has been brought to a closed position engaging said transmission for propulsion of said vehicle 100. After the method step s422 a subsequent method step s423 is performed.

The method step s423 comprises the step of determining a second set Set2 of condition parameter values, said condition parameters comprising requested engine torque Tq_demand, engine speed Neng and engine parameter value Delta_Neng. If at least one of said second set of condition parameter values meets a respective second predetermined condition a subsequent method step s424 is performed.

The step s423 comprises the step of determining if said determined requested engine torque value Tq_demand is equal or larger than an engine torque value Tq_min*. Said engine torque value Tq_min* is defined as Tq_min+A, where A is a suitable positive number. Tq_min* is thus larger than said engine torque value Tq_min. If said determined engine torque value Tq_min is equal or larger than said engine torque value Tq_min* the method step s424 is performed.

The method step s423 comprises the step of determining if said determined engine speed Neng is less than a second predetermined engine speed threshold value Nth2. Nth2 is a suitable value which is smaller than said first predetermined engine speed threshold value Nth1. If said determined engine speed Neng is less than said second predetermined engine speed threshold value Nth2 the method step s424 is performed.

The method step s423 comprises the step of determining if said determined engine parameter value Delta_Neng is less than an engine parameter threshold value Delta_Neng*. The value Delta_Neng* is a suitable value which is larger than said engine parameter threshold value Delta_NengTh. If said determined engine parameter threshold value Delta_Neng is less than said predetermined engine parameter threshold value Delta_Neng* the method step s424 is performed.

It should be noted that if:

Tq_demand is equal or larger than an engine torque value Tq_min*; or

Neng is less than a second predetermined engine speed threshold value Nth2; or

Delta_Neng is less than said predetermined engine parameter threshold value Delta_Neng* said method step s424 is performed.

The method step s424 comprises the step of de-activating said function F so as to again allow fuel provision to said engine 231. This is performed after said selected gear step GS has been activated and said clutch arrangement 241 has been brought to a closed position.

After the method step s424 said first method step s420 is performed.

Figure 5:
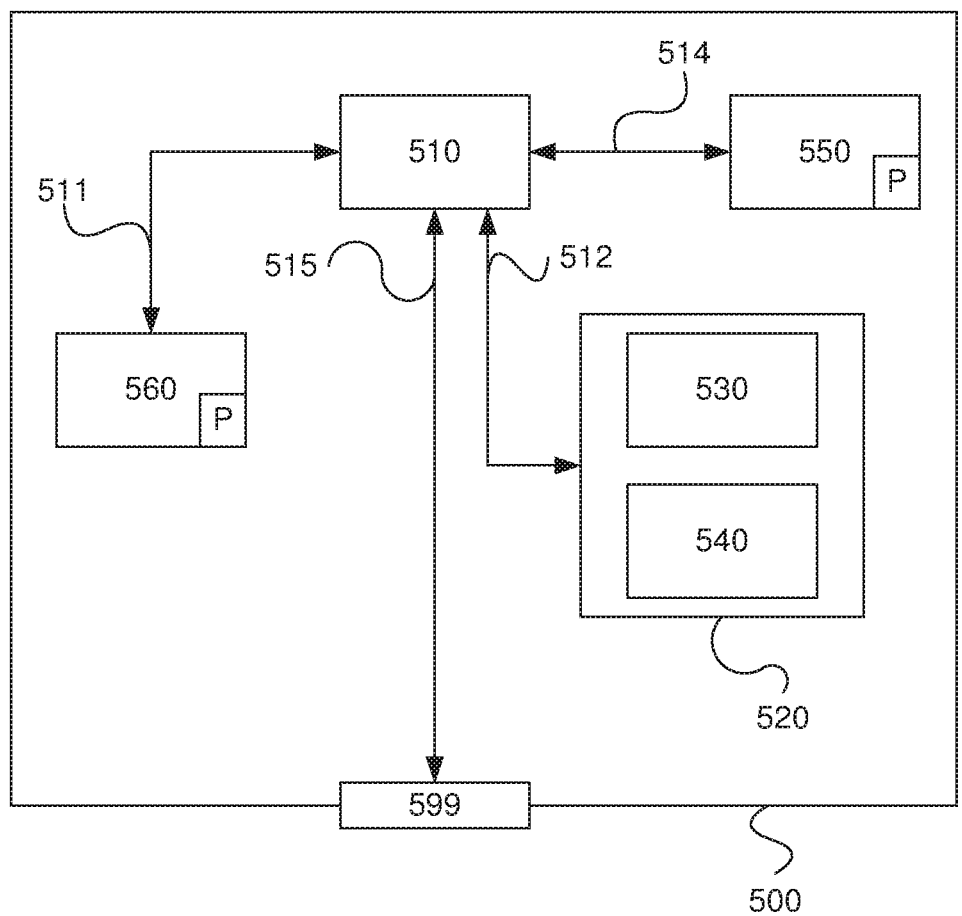
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

The computer program P comprises routines for improved gear shifting of a vehicle 100 having an Otto-engine 231 and a manually actuated clutch of the vehicle transmission.

The computer program P may comprise routines for determining a first set Set1 of condition parameter values, said parameters comprising clutch position CP, requested engine torque Tq_demand and engine speed Neng.

The computer program P may comprise routines for determining if said first set of condition parameter values meet first predetermined conditions.

The computer program P may comprise routines for, if said first predetermined conditions of said first set of condition parameter values are met, activating a function F for interrupting fuel provision of said engine 231 before disengaging said vehicle transmission during gear shifting.

The computer program P may comprise routines for determining a gear step value chosen to be shifted to, preferably differing from a neutral gear step. The computer program P may comprise routines for adding said gear step to said first set of condition parameter values.

The computer program P may comprise routines for determining a difference between a prevailing engine speed value and an engine speed should value. The computer program P may comprise routines for adding said difference to said first set of condition parameter values.

The computer program P may comprise routines for determining a prevailing fuel loading value of an exhaust gas catalyst arrangement of the engine. The computer program P may comprise routines for determining a prevailing temperature value of said exhaust gas catalyst arrangement. The computer program P may comprise routines for adding said prevailing fuel loading value and said temperature value to said first set of condition parameter values.

The computer program P may comprise routines for determining a second set of condition parameter values, said condition parameters comprising requested engine torque Tq_demand and engine speed Neng. The computer program P may comprise routines for, if at least one of said second set of condition parameter values meets a respective second predetermined condition, de-activating said function F so as to allow fuel provision.

The computer program P may comprise routines for determining a second set of condition parameter values, said condition parameters comprising requested engine torque Tq_demand, engine speed Neng and a difference Delta_Neng between a prevailing engine speed Neng and an engine speed should value. The computer program P may comprise routines for, if at least one of said second set of condition parameter values meet a respective second predetermined condition, de-activating said function F so as to allow fuel provision.

The computer program P may comprise routines for controlling provision said engine fuel in a vaporized form.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L220, L230, L240, L250, L260, L269, L275 for example, may be connected to the data port 599 (see FIG. 2a, 2b, 2c).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for improved gear shifting of a vehicle having an Otto-engine and a vehicle transmission with a manually actuated clutch, said method comprising the steps of:
   determining a first set of condition parameter values comprising clutch position, requested engine torque and engine speed;
   determining if said first set of condition parameter values meet first predetermined conditions; and
   if said first predetermined conditions of said first set of condition parameter values are met, activating a function for interrupting fuel provision of said engine before disengaging said vehicle transmission during gear shifting.

2. The method according to claim 1, comprising the steps of:
   determining a gear step value chosen to be shifted to; and
   adding said gear step to said first set of condition parameter values.

3. The method according to claim 1, comprising the steps of:
   determining a difference between a prevailing engine speed value and an engine speed should value; and
   adding said difference to said first set of condition parameter values.

4. The method according to claim 1, comprising the steps of:
   determining a prevailing fuel loading value of an exhaust gas catalyst arrangement of the engine;
   determining a prevailing temperature value of said exhaust gas catalyst arrangement; and
   adding said prevailing fuel loading value and said temperature value to said first set of condition parameter values.

5. The method according to claim 1, comprising the steps of:
   determining a second set of condition parameter values, said condition parameters comprising requested engine torque and engine speed; and
   if at least one of said second set of condition parameter values meet a respective second predetermined condition, de-activating said function so as to allow fuel provision.

6. The method according to claim 1, comprising the steps of:
   determining a second set of condition parameter values, said condition parameters comprising requested engine torque, engine speed and a difference between a prevailing engine speed and an engine speed should value; and
   if at least one of said second set of condition parameter values meet a respective second predetermined condition, de-activating said function so as to allow fuel provision.

7. The method according to claim 1, comprising the step of:
   providing said engine fuel in a vaporized form.

8. The method according to claim 1, comprising the steps of:
   determining a gear step value chosen to be shifted to, differing from a neutral gear step; and
   adding said gear step to said first set of condition parameter values.

9. A system for improved gear shifting of a vehicle having an Otto-engine and a vehicle transmission with a manually actuated clutch, said system comprising:
   means for determining a first set of condition parameter values comprising clutch position, requested engine torque and engine speed;
   means for determining if said first set of condition parameter values meet first predetermined conditions; and
   means for, if said first predetermined conditions of said first set of condition parameter values are met, activating a function for interrupting fuel provision of said engine before disengaging said vehicle transmission during gear shifting.

10. The system according to claim 9, comprising:
    means for determining a gear step value chosen to be shifted to; and
    means for adding said gear step to said first set of condition parameter values.

11. The system according to claim 9, comprising:
means for determining a difference between a prevailing engine speed value and an engine speed should value; and
means for adding said difference to said first set of condition parameter values.

12. The system according to claim 9, comprising:
means for determining a prevailing fuel loading value of an exhaust gas catalyst arrangement of the engine;
means for determining a prevailing temperature value of said exhaust gas catalyst arrangement; and
means for adding said prevailing fuel loading value and said temperature value to said first set of condition parameter values.

13. The system according to claim 9, comprising:
means for determining a second set of condition parameter values, said condition parameters comprising requested engine torque and engine speed; and
means for, if at least one of said second set of condition parameter values meet a respective second predetermined condition, de-activating said function so as to allow fuel provision.

14. The system according to claim 9, comprising:
means for determining a second set of condition parameter values, said condition parameters comprising requested engine torque, engine speed and a difference between a prevailing engine speed and an engine speed should value; and
means for, if at least one of said second set of condition parameter values meet a respective second predetermined condition, de-activating said function so as to allow fuel provision.

15. The system according to claim 9, comprising:
means for providing said engine fuel in a vaporized form.

16. The system according to claim 9, comprising:
means for determining a gear step value chosen to be shifted to, differing from a neutral gear step; and
means for adding said gear step to said first set of condition parameter values.

17. A vehicle comprising a system for improved gear shifting of a vehicle having an Otto-engine and a vehicle transmission with a manually actuated clutch, said system comprising:
means for determining a first set of condition parameter values comprising clutch position, requested engine torque and engine speed;
means for determining if said first set of condition parameter values meet first predetermined conditions; and
means for, if said first predetermined conditions of said first set of condition parameter values are met, activating a function for interrupting fuel provision of said engine before disengaging said vehicle transmission during gear shifting.

18. The vehicle according to claim 17, which vehicle is any from among a truck, bus or passenger car.

19. A computer program product stored on a non-transitory computer-readable medium, said computer program product for improved gear shifting of a vehicle having an Otto-engine and a vehicle transmission with a manually actuated clutch, said computer program product comprising computer instructions to cause at least one control unit to perform the following operations:
determining a first set of condition parameter values comprising clutch position, requested engine torque and engine speed;
determining if said first set of condition parameter values meet first predetermined conditions; and
if said first predetermined conditions of said first set of condition parameter values are met, activating a function for interrupting fuel provision of said engine before disengaging said vehicle transmission during gear shifting.

* * * * *